(12) United States Patent
Hunter

(10) Patent No.: US 11,718,480 B1
(45) Date of Patent: Aug. 8, 2023

(54) CHAIN CONVEYOR PADDLE ATTACHMENT BRACKET

(71) Applicant: Todd Hunter, Omaha, NE (US)

(72) Inventor: Todd Hunter, Omaha, NE (US)

( * ) Notice: Subject to any disclaimer, the term of this patent is extended or adjusted under 35 U.S.C. 154(b) by 0 days.

(21) Appl. No.: 17/854,370

(22) Filed: Jun. 30, 2022

Related U.S. Application Data

(60) Provisional application No. 63/256,026, filed on Oct. 15, 2021.

(51) Int. Cl.
*B65G 19/24* (2006.01)
*B65G 19/08* (2006.01)

(52) U.S. Cl.
CPC ............. *B65G 19/24* (2013.01); *B65G 19/08* (2013.01)

(58) Field of Classification Search
CPC ...... B65G 19/24; B65G 19/245; B65G 19/08; B65G 17/42; B65G 17/44
See application file for complete search history.

(56) References Cited

U.S. PATENT DOCUMENTS

| | | | | |
|---|---|---|---|---|
| 3,040,873 A * | 6/1962 | Hobbs, Jr. | ............... | B65G 17/42 |
| | | | | 198/712 |
| 4,051,948 A * | 10/1977 | Sackett, Sr. | ............ | B65G 19/08 |
| | | | | 414/398 |
| 4,685,555 A * | 8/1987 | Smith | ..................... | B65G 19/24 |
| | | | | 198/733 |
| 4,736,832 A * | 4/1988 | Rinio | ................... | B65G 17/126 |
| | | | | 198/712 |
| 10,093,485 B1 * | 10/2018 | Gebhardt | ................ | F16G 13/06 |
| 10,377,573 B2 * | 8/2019 | Olson | ..................... | B65G 19/08 |
| 10,822,180 B2 * | 11/2020 | Binford | ................... | B65G 19/24 |

FOREIGN PATENT DOCUMENTS

EP              248969 A   * 12/1987   ............. B65G 19/24

* cited by examiner

*Primary Examiner* — Mark A Deuble

(74) *Attorney, Agent, or Firm* — Nasr Patent Law LLC; Faisal K. Abou-Nasr

(57) ABSTRACT

A chain conveyor paddle attachment bracket for coupling a paddle to a chain link is disclosed. In embodiments, the chain conveyor paddle attachment bracket includes a bent sheet of metal that forms a first portion and a second portion substantially perpendicular to one another. The first portion of the bent sheet of metal includes two notches on opposite sides of the first portion, wherein the two notches are configured to form a welding interface between the first portion of the bent sheet of metal and a sidebar of the chain link. The second portion of the bent sheet of metal includes an opening configured to receive a fastener for connecting the paddle to the second portion of the bent sheet of metal.

18 Claims, 5 Drawing Sheets

CHAIN CONVEYOR PADDLE ATTACHMENT BRACKET

CROSS-REFERENCE TO RELATED APPLICATIONS

The present application claims the benefit under 35 U.S.C. § 119(e) of U.S. Provisional Application No. 63/256,026, filed Oct. 15, 2021, and titled "CHAIN CONVEYOR PADDLE ATTACHMENT BRACKET," which is incorporated herein by reference in its entirety.

TECHNICAL FIELD

The present disclosure generally relates to chain conveyors and, more particularly, to paddle attachment brackets for a chain conveyor.

BACKGROUND

Flat paddle attachment brackets are vertically welded to sidebars of chain links so that paddles can be attached to a chain conveyor. However, this process stresses the sidebars and can cause them to break. Problems may arise from inconsistency of the flat bracket material, inconsistency of the sidebar material, and/or the manner by which a vertical weld affects the structural integrity of the chain. Furthermore, suppliers typically will not warrant chains for such modifications (i.e., vertical welding).

SUMMARY

Aspects of this disclosure relate to a chain conveyor paddle attachment bracket that overcomes the forementioned problems of existing paddle attachment brackets. In particular, a chain conveyor paddle attachment bracket for coupling a paddle to a chain link is disclosed. In embodiments, the chain conveyor paddle attachment bracket includes a bent sheet of metal that forms a first portion and a second portion substantially perpendicular to one another. The first portion of the bent sheet of metal includes two notches on opposite sides of the first portion, wherein the two notches are configured to form a welding interface between the first portion of the bent sheet of metal and a sidebar of the chain link. The second portion of the bent sheet of metal includes an opening configured to receive a fastener for connecting the paddle to the second portion of the bent sheet of metal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Reference will now be made in detail to the subject matter disclosed, which is illustrated in the accompanying drawings.

FIGS. 1 through 9 illustrate a chain conveyor paddle attachment bracket 100 for coupling a paddle to a chain link 200 of a conveyor chain. In embodiments, the chain conveyor paddle attachment bracket 100 includes a bent sheet of metal that forms a first portion 102 and a second portion 106 substantially perpendicular to one another. For example, the chain conveyor paddle attachment bracket 100 may be manufactured from Mild Steel, cut out of Sheet Steel with a laser and broke on a press break at 90 Degree. The term "substantially perpendicular" is used to account for manufacturing deviations (e.g., up to 10% tolerance). Those skilled in the art will also appreciate that other methods/materials may be used to manufacture the chain conveyor paddle attachment bracket 100, and the specific examples provided herein are non-limiting unless otherwise specified in the claims.

Figure 1:
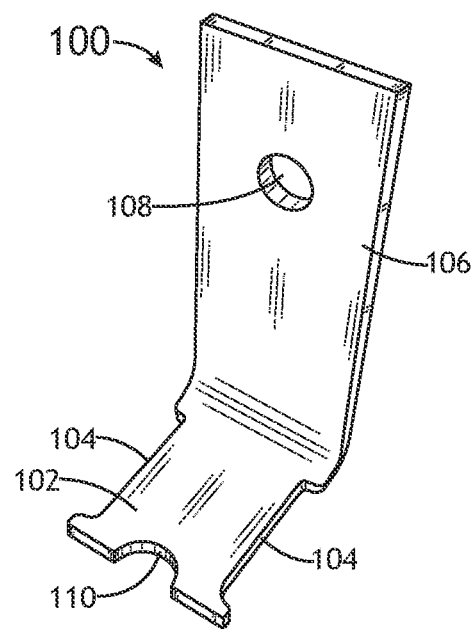
FIG. 1 is a perspective view of a chain conveyor paddle attachment bracket, in accordance with an embodiment of this disclosure.
Figure 2:
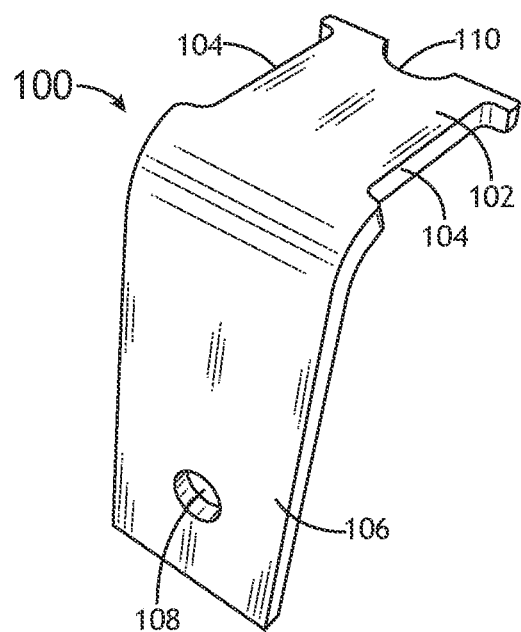
FIG. 2 is another perspective view of the chain conveyor paddle attachment bracket of FIG. 1.
Figure 3:
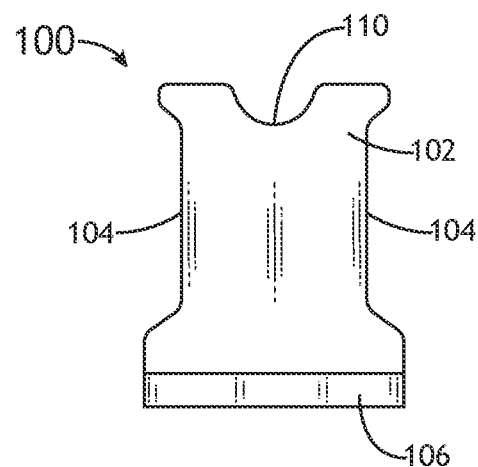
FIG. 3 is a top view of the chain conveyor paddle attachment bracket of FIG. 1.
Figure 4:
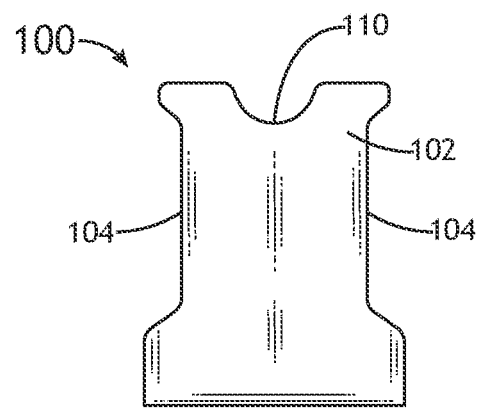
FIG. 4 is a bottom view of the chain conveyor paddle attachment bracket of FIG. 1.
Figure 5:
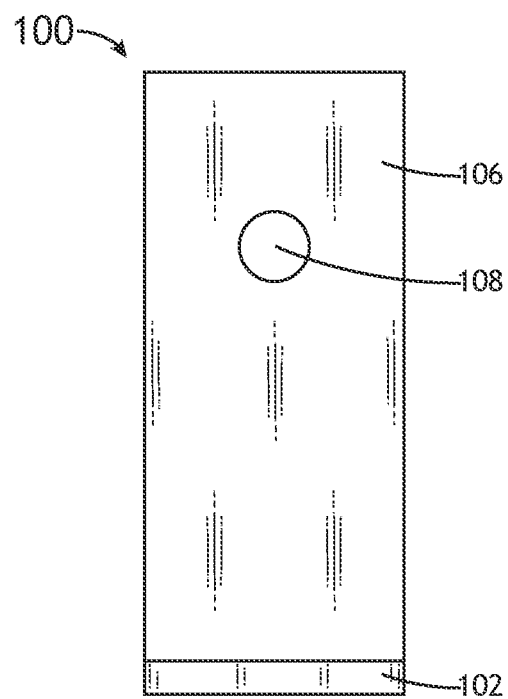
FIG. 5 is a front view of the chain conveyor paddle attachment bracket of FIG. 1.
Figure 6:
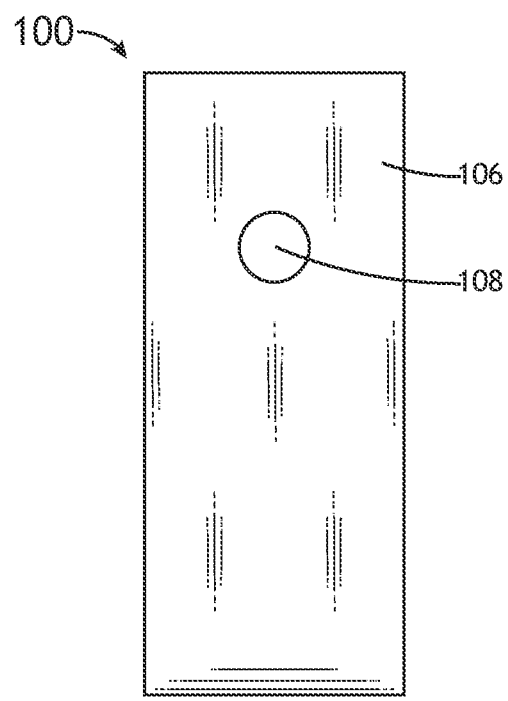
FIG. 6 is a rear view of the chain conveyor paddle attachment bracket of FIG. 1.
Figure 7:
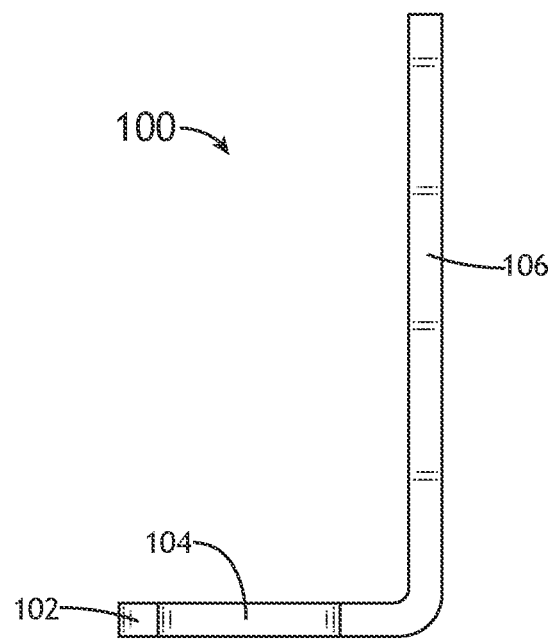
FIG. 7 is a left side view of the chain conveyor paddle attachment bracket of FIG. 1.
Figure 8:
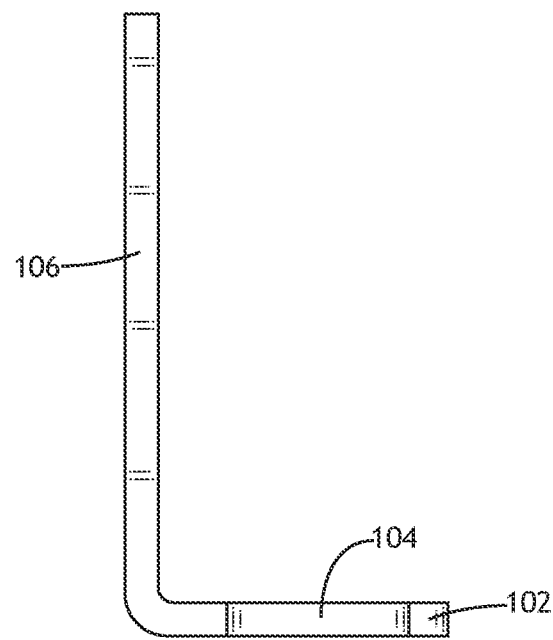
FIG. 8 is a right side view of the chain conveyor paddle attachment bracket of FIG. 1.
Figure 9:
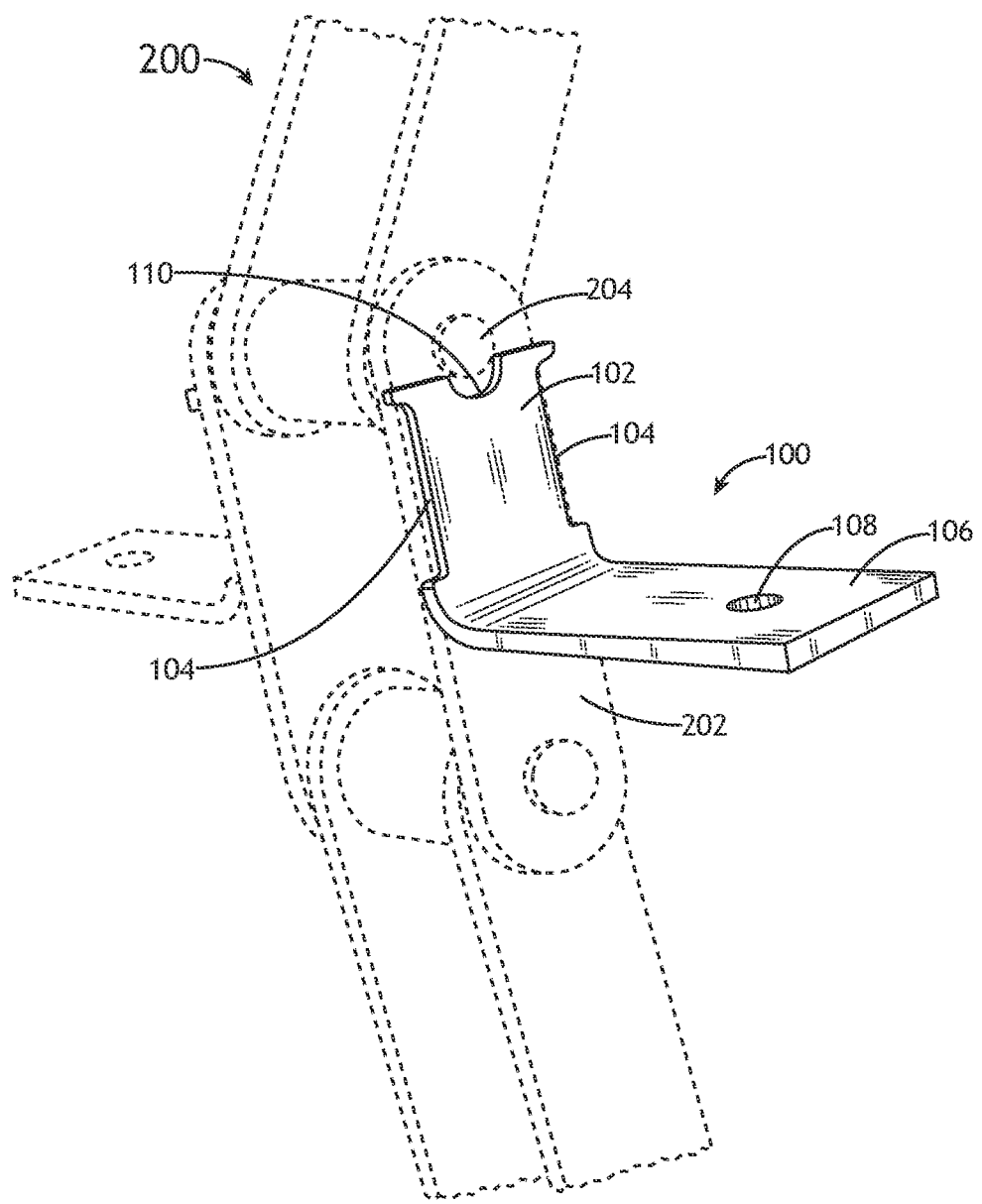
FIG. 9 is an environmental view of the chain conveyor paddle attachment bracket of FIG. 1 coupled to a sidebar of a chain link.

The first portion 102 of the bent sheet of metal includes at least two notches 104 on opposite sides of the first portion, wherein the two notches 104 are configured to form a welding interface between the first portion 102 of the bent sheet of metal and a sidebar 202 of the chain link 200 (see FIG. 9). In some embodiments, the two notches 104 are substantially rectangular or trapezoidal cutouts. Here, the terms "substantially rectangular" or "substantially trapezoidal" are used to account for curved edges or other design features that may slightly alter the overall shape. These notches 104 are provided for the weld to attach to the sidebar 202 of the chain link 200. One reason for the notches 104 is to allow the weld to stay within the width of the sidebar 202 of the chain link 200 so it does not impede the chain installation and/or operation.

The first portion 102 of the bent sheet of metal may further include a third notch 110 on at end of the first portion 102, wherein the third notch 110 is configured to at least partially surround a pivot 204 and allow the chain link 200 to articulate about the pivot 204 without obstruction. In some embodiments, the third notch 110 is a circular segment or arc shaped cutout. For example, the chain conveyor paddle attachment bracket 100 may have a circular back cut at the end of the first portion 102 of the bent sheet of metal. In addition to allowing the chain link 200 to articulate without obstruction, this circular segment or arc shaped cutout (i.e., notch 110) may provide for ease of location when welding the chain conveyor paddle attachment bracket 100 onto the sidebar 202 of a chain link 200. In embodiments, a circular segment may comprise a half circle or other fraction of a circle but will typically be a half circle cutout or less.

The second portion 106 of the bent sheet of metal that forms the chain conveyor paddle attachment bracket 100 extends distally from the first portion 102 and includes an opening 108 (e.g., a hole) configured to receive a fastener for connecting the paddle to the second portion 106 of the chain conveyor paddle attachment bracket 100.

In embodiments, a conveyor system may include a conveyor chain configured to actuate a plurality of paddles coupled to respective chain links of the conveyor chain. As shown in FIG. 9, respective ones of the chain links 200 may be coupled with a chain conveyor paddle attachment bracket 100 for coupling a paddle to the chain link 200.

A method of coupling a paddle to a chain link 200 that utilizes the chain conveyor paddle attachment bracket 100 may include the steps of: (i) welding the first portion 102 of the bent sheet of metal to the sidebar 202 of the chain link 200 at the welding interface formed by the two notches 104; and (ii) attaching the paddle to the second portion 106 of the bent sheet of metal by inserting a fastener through the paddle and the opening 108 in the second portion 106 of the bent sheet of metal. In some implementations, the third notch 110 can be used at the start of the method to properly position the chain conveyor paddle attachment bracket 100 in relation to the pivot 204 of the chain link 200. For example, the chain conveyor paddle attachment bracket 100 may be positioned such that the third notch 110 at least partially surrounds the pivot 204.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A chain conveyor paddle attachment bracket for coupling a paddle to a chain link, comprising:
    a bent sheet of metal that forms a first portion and a second portion substantially perpendicular to one another;
    the first portion of the bent sheet of metal including two notches on opposite sides of the first portion, wherein the two notches are configured to form a welding interface between the first portion of the bent sheet of metal and a sidebar of the chain link; and
    the second portion of the bent sheet of metal including an opening configured to receive a fastener for connecting the paddle to the second portion of the bent sheet of metal.

2. The chain conveyor paddle attachment bracket of claim 1, wherein the two notches are substantially rectangular cutouts.

3. The chain conveyor paddle attachment bracket of claim 1, wherein the two notches are substantially trapezoidal cutouts.

4. The chain conveyor paddle attachment bracket of claim 1, wherein the first portion of the bent sheet of metal further includes a third notch on an end of the first portion, wherein the third notch is configured to at least partially surround a pivot and allow the chain link to articulate about the pivot without obstruction.

5. The chain conveyor paddle attachment bracket of claim 4, wherein the third notch is a circular segment shaped cutout.

6. The chain conveyor paddle attachment bracket of claim 4, wherein the third notch is an arc shaped cutout.

7. A conveyor system, comprising:
    a conveyor chain configured to actuate a plurality of paddles coupled to respective chain links of the conveyor chain, wherein each of the respective chain links is coupled with a chain conveyor paddle attachment bracket for coupling a paddle to the chain link, the chain conveyor paddle attachment bracket, comprising:
        a bent sheet of metal that forms a first portion and a second portion substantially perpendicular to one another;
        the first portion of the bent sheet of metal including two notches on opposite sides of the first portion, wherein the two notches are configured to form a welding interface between the first portion of the bent sheet of metal and a sidebar of the chain link; and
        the second portion of the bent sheet of metal including an opening configured to receive a fastener for connecting the paddle to the second portion of the bent sheet of metal.

8. The conveyor system of claim 7, wherein the two notches are substantially rectangular cutouts.

9. The conveyor system of claim 7, wherein the two notches are substantially trapezoidal cutouts.

10. The conveyor system of claim 7, wherein the first portion of the bent sheet of metal further includes a third notch on an end of the first portion, wherein the third notch is configured to at least partially surround a pivot and allow the chain link to articulate about the pivot without obstruction.

11. The conveyor system of claim 10, wherein the third notch is a circular segment shaped cutout.

12. The conveyor system of claim 10, wherein the third notch is an arc shaped cutout.

13. A method of coupling a paddle to a chain link, comprising:
    providing a bent sheet of metal that forms a first portion and a second portion substantially perpendicular to one another: the first portion of the bent sheet of metal including two notches on opposite sides of the first portion, wherein the two notches are configured to form a welding interface between the first portion of the bent sheet of metal and a sidebar of the chain link; and the second portion of the bent sheet of metal including an opening for connecting the paddle to the second portion of the bent sheet of metal;
    welding the first portion of the bent sheet of metal to the sidebar of the chain link at the welding interface formed by the two notches; and
    attaching the paddle to the second portion of the bent sheet of metal by inserting a fastener through the paddle and the opening in the second portion of the bent sheet of metal.

14. The method of claim 13, wherein the two notches are substantially rectangular cutouts.

15. The method of claim 13, wherein the two notches are substantially trapezoidal cutouts.

16. The method of claim 13, wherein the first portion of the bent sheet of metal further includes a third notch on an end of the first portion, wherein the third notch is configured to at least partially surround a pivot and allow the chain link to articulate about the pivot without obstruction.

17. The method of claim 16, wherein the third notch is a circular segment shaped cutout.

18. The method of claim 16, wherein the third notch is an arc shaped cutout.

\* \* \* \* \*